(12) United States Patent
Kloppmann et al.

(10) Patent No.: US 7,949,551 B2
(45) Date of Patent: May 24, 2011

(54) PROCESSING OF COMPENSATION SCOPES IN WORKFLOW MANAGEMENT SYSTEMS

(75) Inventors: Matthias Kloppmann, Sindelfingen (DE); Dieter Koenig, Herrenberg (DE); Dieter Roller, Schoenaich (DE); Gunnar Wilmsmann, Schoenbuch (DE); Claudia Zentner, Stuttgart (DE)

(73) Assignee: International Business Machines Corporation, Armonk, NY (US)

( * ) Notice: Subject to any disclaimer, the term of this patent is extended or adjusted under 35 U.S.C. 154(b) by 1291 days.

(21) Appl. No.: 11/377,527

(22) Filed: Mar. 16, 2006

(65) Prior Publication Data

US 2006/0277024 A1 Dec. 7, 2006

(30) Foreign Application Priority Data

Jun. 4, 2005 (DE) .................................. 05102711

(51) Int. Cl.
G06F 9/44 (2006.01)
G06F 9/46 (2006.01)
(52) U.S. Cl. .............................................. 705/7; 705/8
(58) Field of Classification Search .................. 705/7, 8
See application file for complete search history.

(56) References Cited

U.S. PATENT DOCUMENTS

| | | | | | |
|---|---|---|---|---|---|
| 4,321,666 | A | * | 3/1982 | Tasar et al. ...................... 714/10 |
| 5,329,626 | A | * | 7/1994 | Klein et al. ..................... 709/248 |
| 5,375,212 | A | * | 12/1994 | Saini ............................. 712/244 |
| 5,416,912 | A | * | 5/1995 | Saini ............................. 712/244 |
| 5,819,022 | A | * | 10/1998 | Bandat ........................... 714/16 |
| 5,826,239 | A | * | 10/1998 | Du et al. ......................... 705/8 |
| 5,870,545 | A | * | 2/1999 | Davis et al. .................... 709/201 |
| 5,878,206 | A | * | 3/1999 | Chen et al. ...................... 714/19 |
| 6,009,405 | A | * | 12/1999 | Leymann et al. .................. 705/9 |
| 6,041,306 | A | * | 3/2000 | Du et al. .......................... 705/8 |
| 6,078,902 | A | * | 6/2000 | Schenkler ....................... 705/35 |
| 6,233,585 | B1 | * | 5/2001 | Gupta et al. ....................... 1/1 |
| 6,526,388 | B1 | * | 2/2003 | Sakaguchi et al. ................ 705/8 |
| 6,634,023 | B1 | * | 10/2003 | Komatsu et al. ............... 717/159 |
| 6,918,053 | B1 | * | 7/2005 | Thatte et al. .................... 714/16 |

(Continued)

FOREIGN PATENT DOCUMENTS

EP 0853277 A2 7/1998

(Continued)

OTHER PUBLICATIONS

Coleman, Joey, Examining BPEL's Compensation Construct \chool of Computing Science, University of Newcastle, 2005.*
Du, Weimin et al., Flexible Compensation of Workflow Processes HP Laboratories, Feb. 1997, HPL-96-72.*

(Continued)

*Primary Examiner* — Scott L Jarrett
(74) *Attorney, Agent, or Firm* — Yee & Associates, P.C.; Justin M. Dillon (57) ABSTRACT

The current invention relates to a technology for processing of compensation scopes comprised within atomic scopes of a process model by a Workflow Management System or a computer system with comparable functionality (WFMS). The method comprises a step of checking whether the atomic scope of the process instance of that process model has been aborted abnormally. If this is the case, in a further step it is analyzed if in the process model the compensation scope has been associated with a specific atomic scope behavior specification, defining a specific abort handling for the compensation scope in the particular case that the compensation scope is comprised within an atomic scope and the atomic scope has been aborted. In a final step the compensation scope is processed according to the specific atomic scope behavior specification.

12 Claims, 7 Drawing Sheets

U.S. PATENT DOCUMENTS

| | | | |
|---|---|---|---|
| 6,983,395 B2* | 1/2006 | Chen et al. ..................... | 714/4 |
| 7,207,047 B2* | 4/2007 | Subramanian et al. ........ | 719/313 |
| 7,403,878 B2* | 7/2008 | Leymann et al. .............. | 703/2 |
| 7,475,275 B2* | 1/2009 | Chafle et al. .................. | 714/4 |
| 7,640,450 B1* | 12/2009 | Anvin et al. ................... | 714/2 |
| 2002/0180810 A1* | 12/2002 | Charters et al. ............... | 345/853 |
| 2003/0110070 A1* | 6/2003 | De Goeij ........................ | 705/8 |

FOREIGN PATENT DOCUMENTS

| | | |
|---|---|---|
| EP | 0969363 A2 | 1/2000 |
| WO | 2004025461 A2 | 3/2004 |

OTHER PUBLICATIONS

Hagen, Claus et al., Exception Handling in Workflow Management Systems IEEE Transactions on Software Engineering, vol. 26, No. 10, Oct. 2000.*

Chessell, M. et al., Extending the concept of transaction compensation IBM Systems journal, vol. 41, No. 4, 2002.*

Robeller, Anke et al., Using Compensation in Business Processes with Business Process Choreographer International Business Machines, Apr. 2006.*

Leymann, Frank et al., Modeling business processes with BPEL4WS Springer, Nov. 26, 2005.*

Kloppman et al., Business process choreography in Websphere: Combining he power of BPEL and J2EE IBM Systems Jornal, vol. 23, No. 2, 2004.*

Liu, Chengeri et al., Improving Backward Recovery in Workflow Systems In Conference on Database Systems for Advanced Applications, 2001.*

Getting Started with Microsoft BizTalk Server 2000—Help Manual Microsoft, 1999-2000.*

Kamath, Mohan et al., Failure Handling and Coordinated Execution of Concurrent Workflows Proceedings of the Fourteenth International Conference on Data Engineering, p. 334-341, Feb. 23-27, 1998.*

Eder, Johann et al., Workflow Recovery in IFCIS Conference on Cooperative Information Systems, 1996.*

Du, Weimin et al., Flexible Specification of Workflow Compensation Scopes ACM Gorup 97, 1997.*

Kiepiuszewski, Bartek et al., FlowBack: Providing Backward Recovery for Workflow Management Systems DSTC Technical Report, Proceedings of the 1998 ACM SIGMOND international conference on Management of data.*

Muhlberger, Ralf et al., Backward Step: the Right Direction for Production Workflow Systems Proceedings of the Tenth Australasian Database Conference, 1999.*

Worah, D. et al., An Error Handling Framework for the ORBWork Workflow Enactment Service of METEOR Technical Report, Dept. of Computer Science, Univ. of Georgia, 1997.*

L:uo Zongwei et al., Exception Handling in Workflow Systems Applied Intelligence, vol. 13, 2000.* iSeries Version 5, Release 3—Commitment Control IBM, 2005.*

Eder, Johann et al., Worfklow Recovery IFCIS Conference onf Cooperative Information Systems, 1996.*

Gray et al., "Transaction Processing: Concepts and Techniques", 1993, pp. 187-190, 531-539, 586-603.

* cited by examiner

```
1    <scope name="processProposal" acid="true">
2        <faultHandlers>
3            <catchAll>
4                <do whatever is needed activity/>
5            </catchall>
6        </faultHandlers>
7        <sequence>
8            <invoke name="updateItems"
                partnerLink="itemDB"
                portType="itemDBPT"
                operation="update"
                variable="itemsBought"
9            <invoke name="updateProposal"
                partnerLink="proposalDB"
                portType="proposalDBPT"
                operation="update"
                variable="proposal"/>
10       </sequence>
11   </scope>
```

Fig. 1

```
12  <scope name="processProposal">

13      <faultHandlers>
14          <catchAll>
15              <compensate/>
16          </catchall>
17      </faultHandlers>

18      <sequence>

19          <invoke name="updateItems"
                partnerLink="itemDB"
                portType="itemDBPT"
                operation="update"
                variable="itemsBought">
20              <compensationHandler>
21                  <invoke name="resetItems"
                        partnerLink="itemDB"
                        portType="itemDBPT"
                        operation="reset"
                        variable="itemsBought"/>
22              </compensationHandler>
23          </invoke>

24          <invoke name="updateProposal"
                partnerLink="proposalDB"
                portType="proposalDBPT"
                operation="update"
                variable="proposal">

25              <compensationHandler>
26                  <invoke name="resetProposal"
                        partnerLink="proposalDB"
                        portType="proposalDBPT"
                        operation="reset"
                        variable="proposal"/>
27              </compensationHandler>
28          </invoke>

29      </sequence>

30  </scope>
```

Fig. 2

```
31  <scope name="processProposal" acid="true">
32      <sequence>
33          <invoke name="updateItems"
                  partnerLink="itemDB"
                  portType="itemDBPT"
                  operation="update"
                  variable="itemsBought"
34          <scope name="sendProposal">
35              <compensationHandler>
36                  <invoke name="revokeProposal"
                          partnerLink="customer"
                          portType="proposalPT"
                          operation="revoke"
                          variable="proposal"/>
37              </compensationHandler>
38              <invoke name="sendProposal"
                      partnerLink="customer"
                      portType="proposalPT"
                      operation="send"
                      variable="proposal"/>
39          </scope>
40          <invoke name="updateProposal"
                  partnerLink="proposalDB"
                  portType="proposalDBPT"
                  operation="update"
                  variable="proposal"/>
41      </sequence>
42  </scope>
```

43   send proposal
44   send countermanding email
45   send proposal

Fig. 5

46  <scope name="sendProposal"
     atomicScopeRollbackBehavior="??">

Fig. 6

47   send proposal
48   send proposal

Fig. 7

49  <scope name="sendProposal"
     atomicScopeRollbackBehavior=
     ("Cause","Behavior")>

Fig. 8

49 <scope name="sendProposal"
    atomicScopeRollbackBehavior=
    ("deadlock","noAction")>

PROCESSING OF COMPENSATION SCOPES IN WORKFLOW MANAGEMENT SYSTEMS

1. BACKGROUND OF THE INVENTION

1.1 Field of the Invention

The present invention relates to Workflow Management System or a computer system with comparable functionality (WFMS). More particularly the invention relates to a method and means for processing of compensation scopes in a process model in the particular instance that the compensation scopes are comprised within atomic scopes.

1.2 Description and Disadvantages of Prior Art

A new area of technology with increasing importance is the domain of Workflow-Management-Systems (WFMS). WFMS support the modeling and execution of business processes. Business processes executed within a WFMS environment control who will perform which piece of work of a network of pieces of work and which resources are exploited for this work. The individual pieces of work might be distributed across a multitude of different computer systems connected by some type of network.

IBM WebSphere Business Process Choreographer represents such a typical modern, sophisticated, and powerful workflow management system. It supports the modeling of business processes as a network of activities. This network of activities, the process model, is constructed as a directed, acyclic, weighted, colored graph. The nodes of the graph represent the activities, which define the individual tasks that need to be carried out. In general, each of the activities is associated with a piece of code that implements the appropriate task. The edges of the graph, the control connectors, describe the potential sequence of execution of the activities. Definition of the process graph is via a graphical editor or a flow definition language, such as Business Process Execution Language for Web Services (BPELWS).

Advanced WFMSs support the notion of scopes, also named spheres. A scope provides the capability to assign a set of properties or handlers to a set of activities. In particular, scopes are used to specify transaction boundaries:

- an atomic scope indicates that the enclosed activities are carried out as an atomic transaction;
- a compensation scope indicates that the enclosed activities are part of a long running transaction. In addition to the enclosed activities compensation scopes allow to define so-called compensation activities which are executed after abnormal termination of a compensation scope to compensate, i.e. to undo, the effects of the execution of the activities within the compensation scope prior to the abnormal termination.

If a compensation scope is embedded within an atomic scope, the combined rollback and restart processing may cause certain anomalies.

1.3 Objective of the Invention

Therefore a need exists in prior art to avoid these anomalies by introducing an alternate and improved rollback handling of a compensation scope comprised within an atomic scope.

2. SUMMARY AND ADVANTAGES OF THE INVENTION

The objectives of the invention are solved by the independent claims. Further advantageous arrangements and embodiments of the invention are set forth in the respective subclaims.

The current invention relates to a technology for processing of compensation scopes comprised within atomic scopes of a process model by a Workflow Management System or a computer system with comparable functionality (WFMS).

The method comprises a step of checking whether the atomic scope of the process instance of that process model has been aborted abnormally. If this is the case, in a further step it is analyzed if in the process model the compensation scope has been associated with a specific atomic scope behavior specification, defining a specific abort handling for the compensation scope in the particular case that the compensation scope is comprised within an atomic scope and the atomic scope has been aborted. In a final step the compensation scope is processed according to the specific atomic scope behavior specification.

Based on the specific atomic scope behavior specification the WFMS is enabled to re-execute compensation scopes comprised within transaction scopes after abnormal termination of the transaction scope in a manner of avoiding processing anomalies which occur in prior art technologies.

4. DESCRIPTION OF THE PREFERRED EMBODIMENT

In the drawings and specification there has been set forth a preferred embodiment of the invention and, although specific terms are used, the description thus given uses terminology in a generic and descriptive sense only and not for purposes of limitation. It will, however, be evident that various modifications and changes may be made thereto without departing from the broader spirit and scope of the invention as set forth in the appended claims.

The present invention can be realized in hardware, software, or a combination of hardware and software. Any kind of computer system—or other apparatus adapted for carrying out the methods described herein—is suited. A typical combination of hardware and software could be a general-purpose computer system with a computer program that, when being loaded and executed, controls the computer system such that it carries out the methods described herein. The present invention can also be embedded in a computer program product, which comprises all the features enabling the implementation of the methods described herein, and which—when being loaded in a computer system—is able to carry out these methods.

Computer program means or computer program in the present context mean any expression, in any language, code or notation, of a set of instructions intended to cause a system having an information processing capability to perform a particular function either directly or after either or both of the following a) conversion to another language, code or notation; b) reproduction in a different material form.

The current invention is illustrated based on IBM's WebSphere Business Process Choreographer using Business Process Execution Language for Web Services (BPEL4WS) as the language for describing business processes. Of course any other WFMS using any other language for describing business processes could be used instead. It should be further noted, that Web Services are just one particular type of executable; they are used for illustration only; any type of executable implemented in any type of software and hardware can be used. Furthermore the current teaching applies also to any other type of system, which offers WFMS functionalities not as a separate WFMS but within some other type of system.

4.1 Introduction

Web services are components, which are based on the industry standards Web Services Definition Language (WSDL), Universal Description, Discovery & Integration (UDDI), and Simple Object Application Protocol (SOAP). They enable to connect different components even across organizational boundaries in a platform and language independent manner. Business Process Execution Language for Web Services (BPEL4WS or BPEL for short) provides for the specification of business processes which invoke Web services and for providing business processes as Web services.

The piece of software that carries out business processes is normally called a Workflow Management System (WFMS) or sometimes, more specifically, a BPEL engine. The component implements all the constructs prescribed by the BPEL specifications. In particular, the component must make sure that the invoked Web services are carried out as prescribed. For any failure of the process or a Web service it must perform the appropriate error correction that means it must make sure that the actions already carried out are undone. The actions that need to be carried out in case of a failure depend primarily on the implementation of the individual Web services; the following approaches are available:

1. Execution of Web service is idempotent; the failing Web service is just invoked a second time. Unfortunately only a very limited number of Web services fall into this category, mainly Web services that query information.
2. The Web service provides compensation logic for undoing the effects of the original Web service. When an error occurs, the compensation logic needs to be invoked to undo the effects.
3. The Web service runs as part of an ACID transaction (Atomicity, Consistency, Isolation, Durability); a failure within the overall transaction is recognized by the transaction manager (which is an entity separate from the WFMS) and the transaction is reset, causing the effects of the individual Web service to be undone as well.
4. The Web service runs as a separate ACID transaction; a failure within the Web service's execution is recognized by the transaction manager and causes the transaction to be rolled back. Any failures outside the transaction are not recognized and are not handled. The effects can only be undone through the provision of appropriate compensation logic.

It would be an ideal world if all Web services are able to participate in ACID transactions; in this situation, an ACID transaction can be established when the process starts. All invoked Web services would participate in the transaction. The transaction commits when the process finishes. If an error occurs, the transaction is rolled back and possibly restarted.

This approach only works if a small set of short-running activities are carried out very quickly. ACID transactions are typically implemented through locking mechanisms. Unless the locks are released very quickly, the system starts serializing the execution of the different transactions. In other words, the execution of the different process instances becomes serialized.

Business processes, however, are often of long duration and use asynchronous messaging for communication. Furthermore, many Web services are unable to participate in ACID transactions; most of them have been implemented as stand-alone transactions or are even using non-transactional features. Those implementations typically provide their own compensation logic; for example, when writing a debit transaction one writes immediately a credit transaction. As a result, the overall business process, or parts thereof, can fail or be cancelled after many individual transactions have been committed during the business process, and the partial work needs to be undone as best as possible. BPEL exploits the notion of compensation that means application-specific activities that attempt to reverse the effects of the original activity. That means each activity is associated with a compensation handler; the activity in the compensation handler specifies the compensating activity. From a business perspective this means a process model comprises one or more so-called compensation scopes.

In general BPEL provides the notion of scopes to provide the behavior context for the activities enclosed in the scope. A scope can provide fault handlers, event handler, compensation handlers, correlation sets, and data variables. In general, scopes can be nested arbitrarily. If necessary, default compensation handlers, or fault handlers are established to provide for a consistent handling.

Since BPEL focuses on business-to-business interactions with Web services as the underlying component model, it defines compensation as the only transaction model. BPEL4J extends the usage of BPEL as a process execution language to the Java environment. It supports in addition to the Web Services model the Enterprise Java Beans (EJB) component model of the Java 2 Enterprise Edition (J2EE). In this environment, the business process can expose itself as an EJB and invokes EJBs. As the EJB container (for example WebSphere) supports the notion of ACID transactions as a major capability, BPEL4J must support ACID transactions. For that purpose, scopes can be flagged with an attribute named "acid" to designate the scope as requiring the enclosed activities to be run in an ACID transaction. Whereas BPEL4J calls those scopes acid scopes, we call them atomic scopes, adopting the appropriate academic terminology. It should be noted that it is the responsibility of the process modeler to design atomic scopes properly to avoid all the problems associated with long-running ACID transactions.

Unfortunately there are situations where a non-transactional Web service, possibly short-running, is part of an atomic scope. In this situation, it is expected that the Web service participates somehow in the transaction, in particular it is expected that the Web service carries out rollback processing if the atomic scope fails.

This situation would be modeled by enclosing the non-transactional Web service within a compensation scope with the result that a compensation scope is enclosed within an atomic scope.

Thus in cases of this structure, in which an atomic scope comprises one or more compensation scopes, undesirable situations can occur when the transaction manager unilaterally aborts the atomic scope; for example when the transaction manager detects a deadlock situation. The current invention proposes a method that helps overcome those anomalies by refining the processing of compensation scopes when enclosed in atomic scopes.

4.2 Atomic Scopes

Atomic scopes are, as already indicated, implemented as ACID transactions. Implementation of the transactions is done via the 2PC (two phase commit) protocol. The workflow management system requests, when the flow of control enters the atomic scope, from the underlying transaction manager the creation of a new transaction. The transaction manager responds to the request with an appropriate transaction context; this context is unique to the newly initiated transaction. When the workflow management system invokes one of the enclosed Web services, it passes this transaction context as part of the invocation. The called Web service uses the passed transaction context to register with the transaction coordinator. The workflow management system finishes the transaction when the flow of control leaves the atomic scope by informing the transaction manager about the successful completion. The transaction manager informs the individual Web services about the successful completion and asks the Web services whether they can commit. If all agree, the transaction is committed. If one of the Web services can not commit, the transaction is aborted. Whether an aborted transaction is restarted is an implementation choice; most workflow management systems do this. If the atomic scope fails more often than a pre-defined number of times, the workflow management system puts, as one option to cope with the situation, the process instance into an error state.

Figure 1:
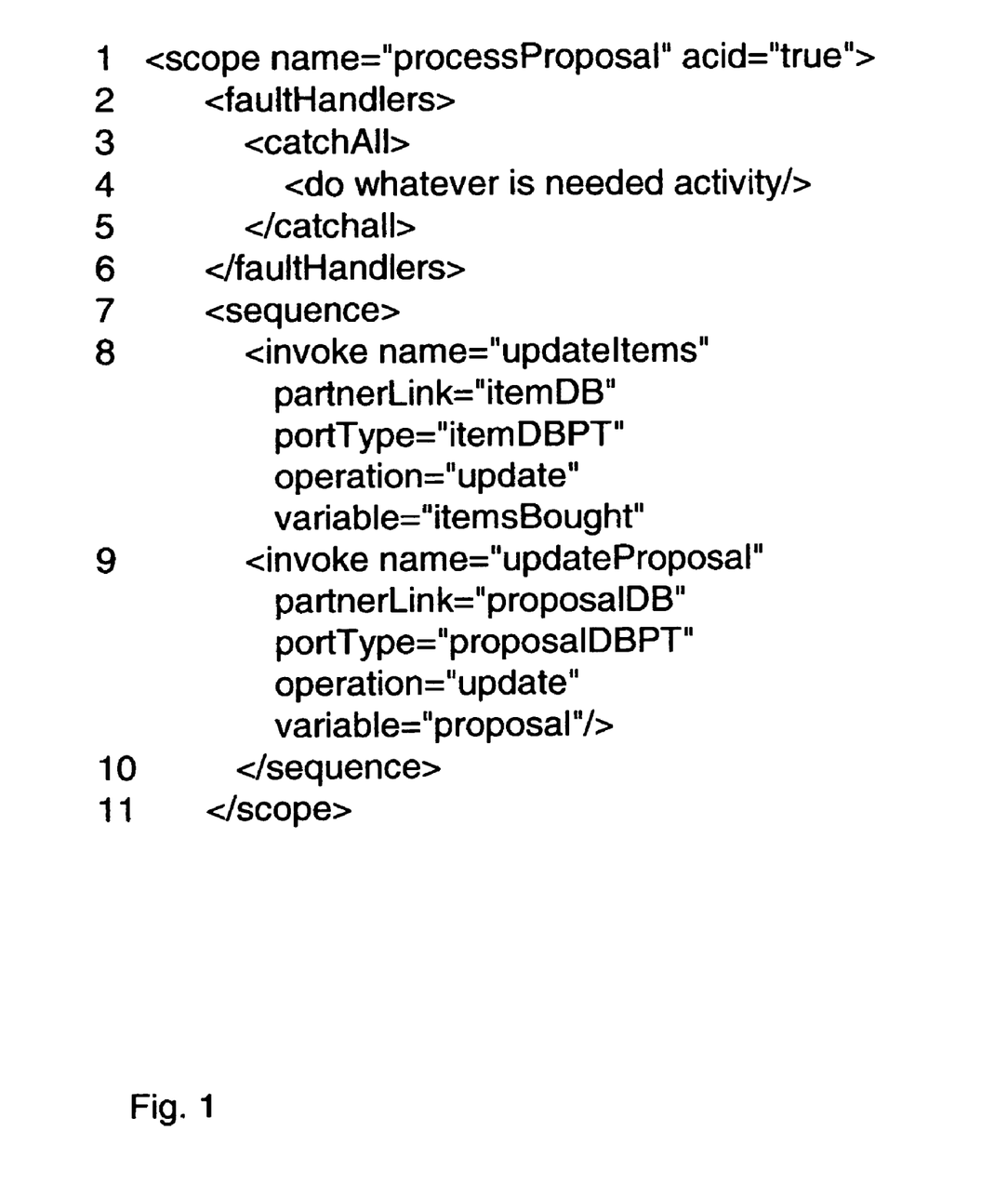
FIG. 1 shows a fragment of an example of a business process model including an atomic scope.

The fragment of an example of a process model shown in FIG. 1 helps illustrate the current processing of an atomic scope. It is a part of a larger order process; the shown activities are carried out one after the other as indicated via the "sequence" activity which starts in line 7 and ends in line 10. The "invoke" activity in line 8 reserves the items the customer has requested/bought by updating the appropriate items database. The activity in line 9 stores the appropriate proposal into a database. Both activities, the reserving of the items in the item database, and the storing of the proposal in the proposal database need to be carried out together; their combined result must not be shown before they both have completed. Thus the two activities are made part of an ACID transaction. This is indicated by enclosing the "sequence" activity within a "scope" activity and setting the acid attribute to "true" (refer to line 1 in FIG. 1).

It should be noted that the atomic scope is not aborted if one of the activities (Web services in this example) signals an error using the standard WSDL mechanism; those errors are caught by the fault handler. The processing within the fault handler is considered part of the transaction and thus not handled by the underlying transaction management system.

If no fault handler is installed, the atomic scope is aborted; that means the transaction is aborted. Thus if a fault handler needs to abort an atomic scope with the intent to let the underlying transaction manager rollback that transaction comprised by atomic sphere it must throw an appropriate fault.

4.3 Compensation Scopes

Compensation, as already pointed out, is an approach to achieve transactional behavior for Web services that can not participate in an ACID transaction. Each Web service or set of Web services must provide a compensation activity. This activity is carried out when the actions of a Web service or set of Web services need to be undone.

Figure 2:
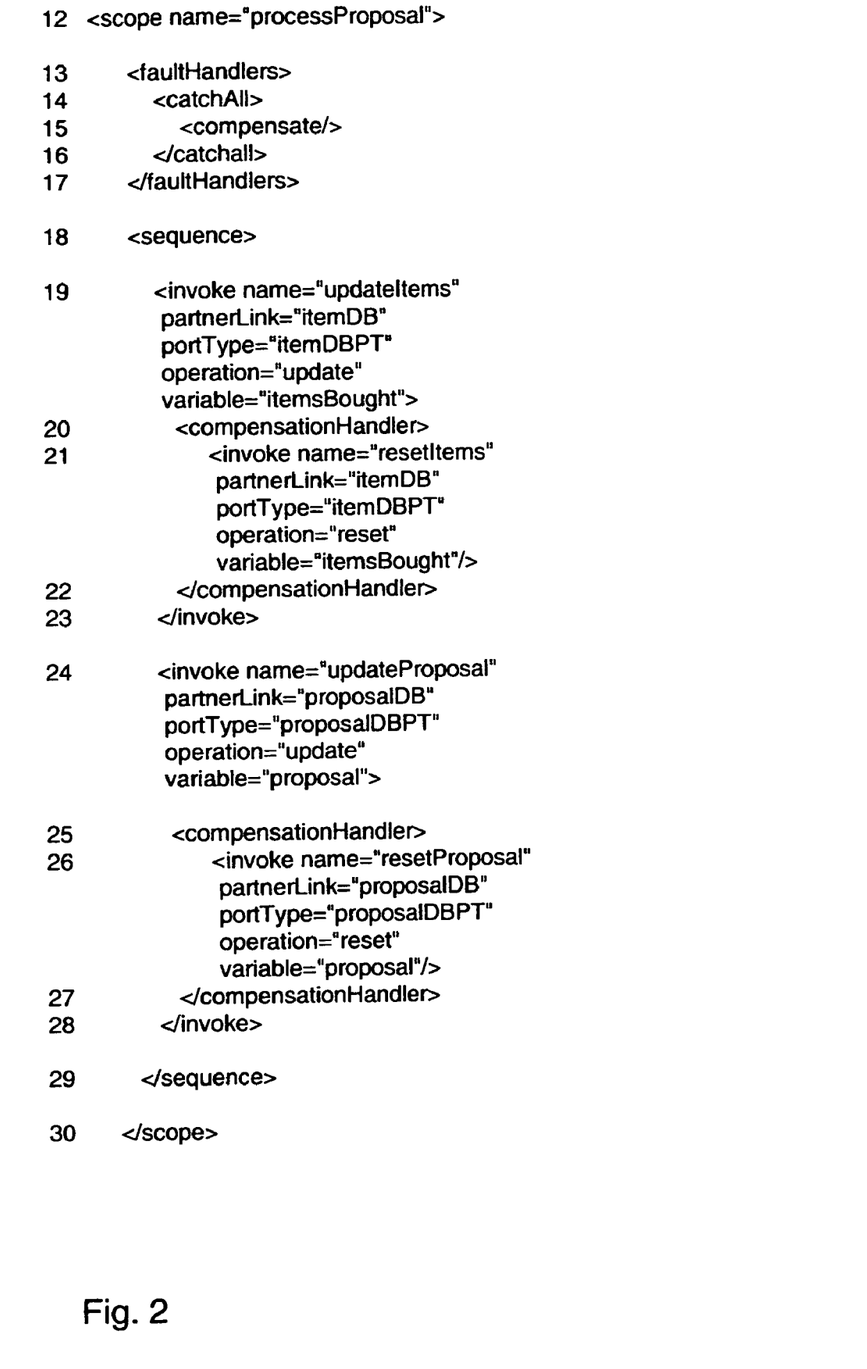
FIG. 2 depicts the process model example of FIG. 1 enhanced by a compensation scope comprised within the atomic scope.

FIG. 2 represents the example of a process model fragment according to FIG. 1 with the simple difference that the activities/Web services can not participate in a transaction. Thus they are enclosed in a compensation scope.

Both activities (line 19, 24) have a compensation handler (line 21, 26) associated with it (note that this particular notation is a BPEL shortcut for an activity enclosed in an outer scope (line 12)). The activity embedded in the compensation handler is typically called the compensation activity of the activity the compensation handler is attached to. The compensation handler is made active when the associated activity or scope has completed successfully. The reason for activating a compensation activity after a compensation scope completed is, that only if the compensation scope actually has been executed, there might be an need to compensate in case of error situations. When an error occurs, the fault handler gets control. The enclosed "compensate" activity (line 15) causes the compensation handlers associated with the enclosed activities to be carried out in reverse order of execution. If, for example, the first activity (line 19) in FIG. 2 has completed and the second activity (line 24) fails, the fault handler gets control and carries out the enclosed "compensate" activity which causes the contents of the active compensation handlers associated with the enclosed activities to be executed; that means only the compensation activities of successfully completed activities are carried out. In our example, this causes the "reset" operation (line 21) of the "itemDBPT" (line 21) port type to be carried out undoing the changes made by the original "update" operation of the "itemDBPT" port type (line 19).

4.4 Enclosing Compensation Scopes in Atomic Scopes

Figure 3:
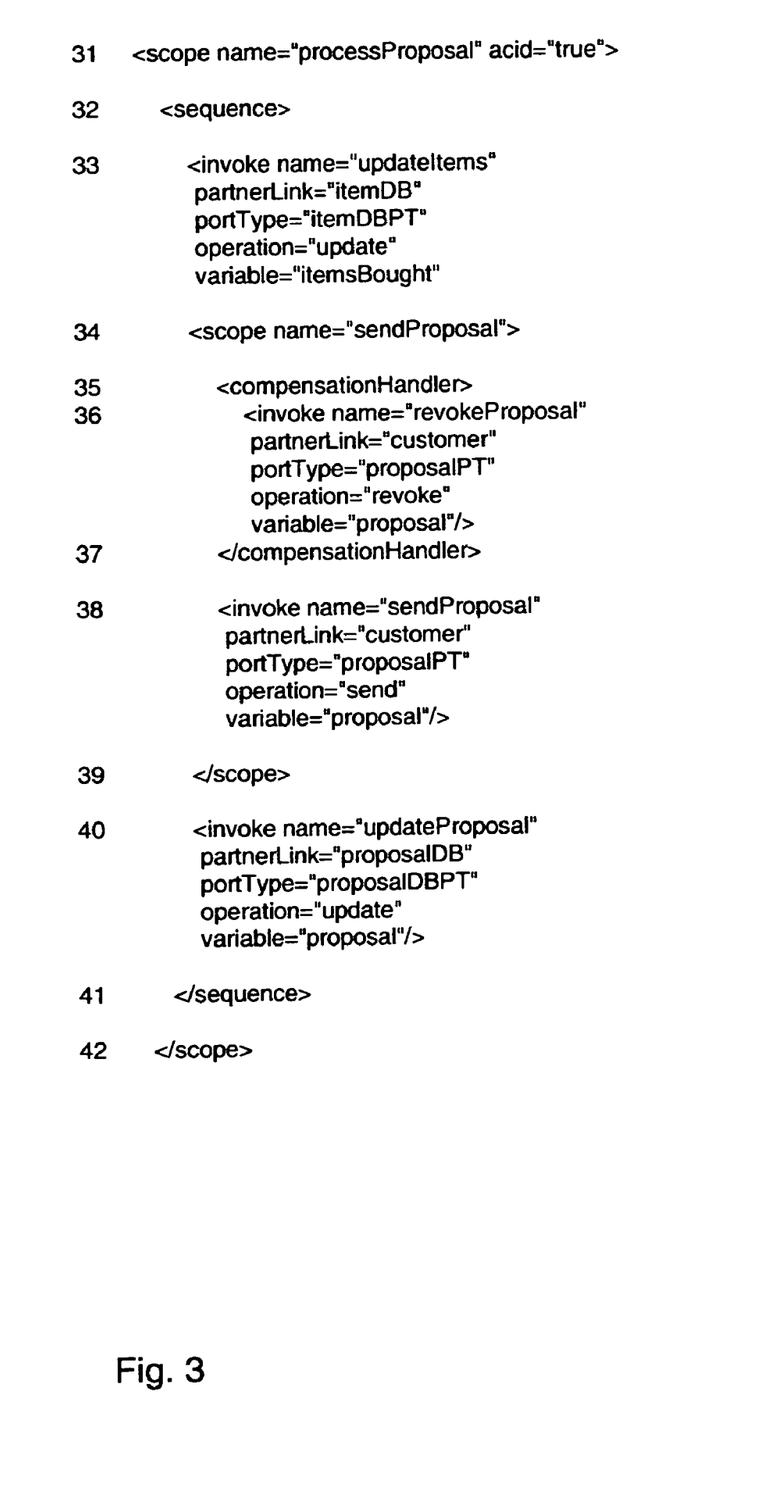
FIG. 3 depicts an extended version of the process model example of FIG. 1 by further adding a non-transactional activity/Web service that sends an e-mail to a customer.

FIG. 3 depicts an extended version of the process model example of FIG. 1 by further adding a non-transactional activity/Web service (line 38) that sends an e-mail to the customer. It is added to the atomic scope (line 31) as it is expected that all three activities are carried out or none of them; i.e. all activities are to be executed in a single transaction. It is obvious that the added activity/Web service must also participate in the transaction processing of the two other activities as it belongs to the same business process. If an error occurs somewhere in the atomic scope (line 31-42), not only need the database changes made by the two original activities (line 33, 40) need to be undone but also the customer must be informed that the proposal does not hold anymore. Informing the customer is done by sending a countermanding letter. Compensating the original letter (line 38) is achieved by enclosing the e-mail activity/Web service (line 38) in a compensation scope (line 34) and providing a compensation activity (line 36).

Figure 4:
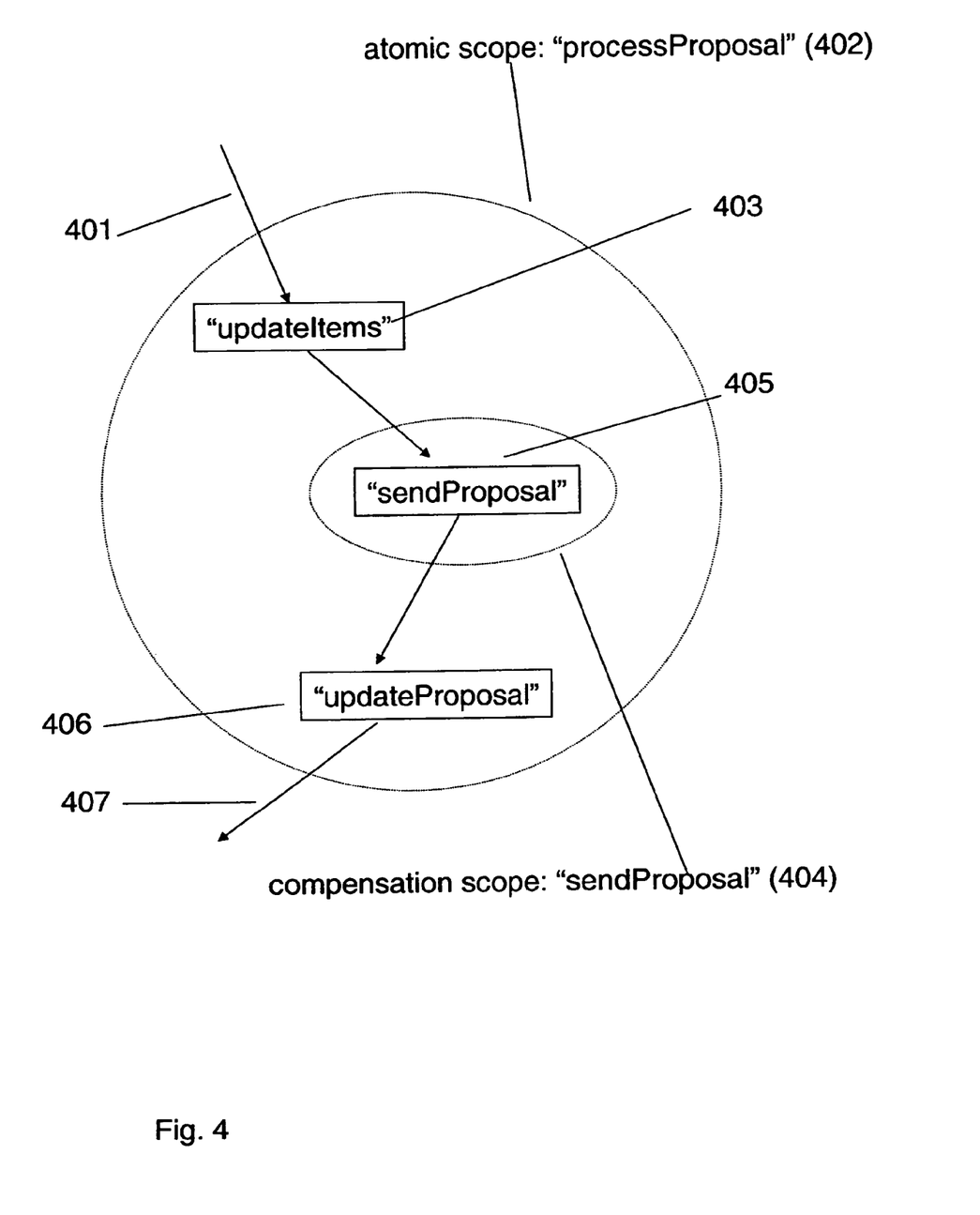
FIG. 4 shows the process model of FIG. 3 in a representation based on a graph.

FIG. 4 shows the process model of FIG. 3 in a representation based on a graph. Along control connector (401) control enters the atomic scope "processProposal" (402) to start the first activity "updateItems" (403) within the atomic scope. Once the "updateItems" activity has been completed control enters the compensation scope "sendProposal" (404) comprised within the atomic scope to start the activity "sendProposal" (405). After successfully execution the compensation scope will be left to pass control to the last activity "updateProposal" (406) before leaving the transaction scope (407) again.

As the shown process fragment has no fault handler associated, an error encountered in the processing of the process model causes the atomic scope to be rolled back. This causes the changes made to the databases to be reset. In addition, the compensation handler of the enclosed compensation scope is invoked to send out the countermanding e-mail.

4.5 The Handling Of Compensation Scopes In Atomic Scopes

IBM WebSphere Business Process Choreographer has the following architecture to implement the combined rollback handling of compensation scopes enclosed in atomic scopes:

When a process navigates through a compensation scope, the workflow management system's compensation manager component is invoked at entry to the compensation scope, for each activity that is being carried out, and when the compensation scope is left.

The compensation manager collects information about the actual execution of the process within the compensation scope including the values that have been passed to the invoked activities/Web services or returned by the invoked Web services. This allows the compensation manager to maintain the precise state information of the compensation scope currently being executed.

If a compensation scope needs to be undone, the compensation manager is invoked to carry out compensation by invoking the appropriate compensation activities.

If a compensation scope is enclosed in an atomic scope, the compensation manager registers itself with the transaction manager as a participant. When the transaction manager needs to abort the transaction associated with the atomic scope, it informs all participants, including the compensation manager. The compensation manager then carries out compensation of the compensation scope.

The described approach has a number of problems. Some of them can be avoided through better process design; some of them need changes to the current processing including a new set of new process model specifications triggering a new behavior of the WFMS.

Figure 5:
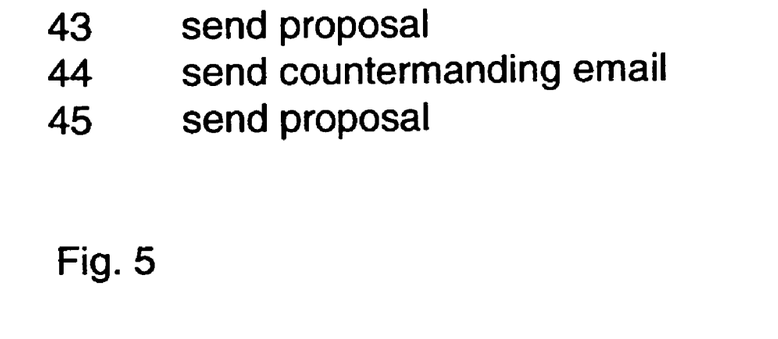
FIG. 5 shows the problem with re-execution of the atomic scope of the process model example of FIG. 3 according to prior art.

A typical problem that can occur for the shown example is the strange externally observable behavior shown in FIG. 5 where the same proposal is sent twice intertwined with a revocation of the proposal. It can occur for example as the result of a deadlock encountered by the database management system used by the invoked activities/Web service(s) or used by the workflow management system. During the processing of the example process model of FIG. 3 the proposal (FIG. 3 line 38) will be sent out a first time (FIG. 5 line 43). Upon detection of the assumed deadlock, the database management system informs the transaction manager and requests the killing of the transaction. Suppose the transaction manager kills the transaction associated with the shown business process fragment, i.e. transaction manager is involving the compensation manager of the comprised compensation scope which in turn calls their corresponding compensation activity (FIG. 3 line 36) and sends out the countermanding e-mail of FIG. 5 line 44. After the transaction has been killed, the transaction manager automatically restarts the transaction which results in the second execution of the "sendProposal" activity (FIG. 3 line 38) and the sending of proposal a second time (FIG. 5 line 45). These actions result in the sequence of external visible events as reflected in FIG. 5.

This behavior is not desirable. The same strange behavior can be observed if an appropriate fault is not caught (as the same rollback operation performed by the transaction manager is executed).

4.6 New Process Model Specifications And Their Processing By The WFMS

The illustrated problem situation, where the undo of the transaction scope (and implicitly the undo of the compensation scope) is followed by the redo of the transaction scope (and also implicitly the redo of the compensation scope) can be solved by enhancing the process model with a new specification within the process model (called "tagging"). The new specification is analyzed by the WFMS at runtime and triggers a specific processing of atomic scopes/compensation scopes by the WFMS in cases the atomic scope is aborted. In the following this new specification is referred to as "atomic scope behavior specification". It is suggested to introduce this new process model specification either in the specification of the compensation scope or in the specification of the atomic scope. The potential enhancement of the compensation scope is discussed first, whereas an enhancement of the atomic scope is illustrated later.

Figure 6:
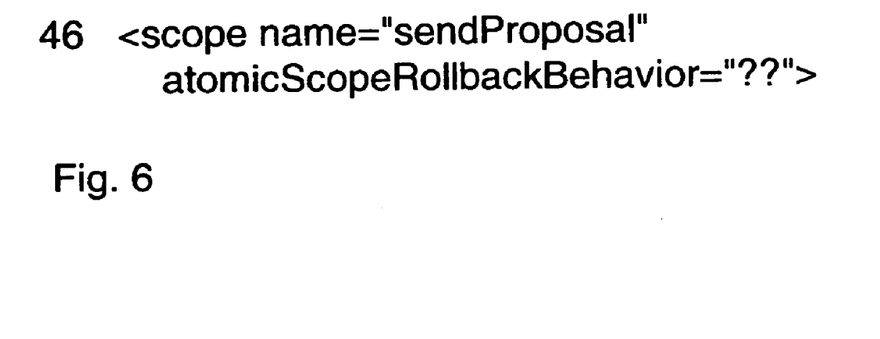
FIG. 6 shows the new "atomic scope behavior specification" according to the current invention.

The suggested tagging of compensation scope is done by adding the "atomicScopeRollbackBehavior" attribute to the compensation scope as shown in FIG. 6 as a replacement of line 34 FIG. 3. The values specified for the "atomicScopeRollbackBehavior" attribute specify the action to be taken when the atomic scope that encloses the compensation scope is aborted and restarted. The following values are suggested for the "atomicScopeRollbackBehavior" attribute:
1. "fullProcessing"
2. "noRollback"
3. "noActions"

If the attribute is set to "fullProcessing", the WFMS carries out processing of the atomic scope as described in FIG. 5 and corresponding description above.

Figure 7:
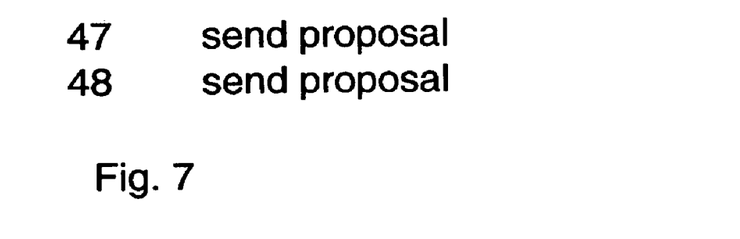
FIG. 7 shows the resulting re-execution of the atomic scope of the process model example of FIG. 3 according to one approach of the current invention.

If the attribute is set to "noRollback", the WFMS does not run compensation for the compensation scope if the atomic scope is abnormally terminated. With respect to the process model example above, this would mean that the revoke proposal e-mail is not sent out. After the transaction is restarted, the compensation scope is processed as usual. The appropriate external behavior is shown in FIG. 7 thus preventing some of the undesired behavior explained in context of FIG. 5.

Another possible value for the attribute is "noActions". In this case, compensation is not run for the compensation scope and re-execution of the compensation scope itself is skipped, when the transaction is restarted. Again, this prevents, in fact completely, the undesired behavior explained in context of FIG. 5.

In our example, this would mean that neither the revoke proposal e-mail nor a new proposal e-mail is sent. This is optimal from a processing viewpoint, as the processing of the business process does not reveal that a transaction has aborted and has been restarted; the transaction abort and restart typically has no business relevance.

Both of the proposed approaches solve the technical problem of inadequate undo/redo processing of atomic scopes including compensation scopes.

Figure 8:
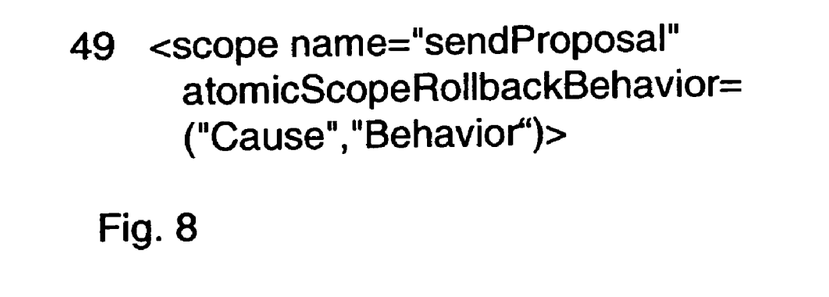
FIG. 8 shows a further embodiment of the new "atomic scope behavior specification" going beyond the embodiment of FIG. 6.

Furthermore, it is suggested to have a different behavior for a different reason causing the atomic scope or compensation scope to be undone and redone. This could be modeled by extending the attribute shown in FIG. 6 as shown in the FIG. 8. According to this further embodiment the atomic scope behavior specification is established as a cause-behavior specification made up of two parts: the first part reflecting the cause of the abnormal handling (condition) and the second part (action) reflecting the type of handling to be performed if the condition of the first part applies.

Figure 9:
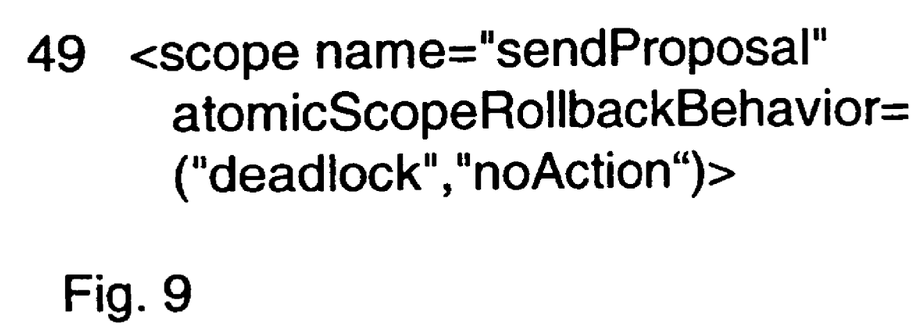
FIG. 9 shows an example of the further embodiment of the new "atomic scope behavior specification" according to FIG. 8.

A typical value for the cause of an undo operation could be of a deadlock situation indicated by a cause of "deadlock". Then the specification according FIG. 9 would indicate that no actions ("noAction") should be carried out when a deadlock has occurred.

Tagging the individual compensation scopes, as illustrated, is just one way of specifying the outlined behavior. Another option would be to provide the attribute on the process level and have all compensation scopes that are enclosed in an atomic scope to adopt the behavior. Alternatively, one could provide an attribute for the atomic scopes and have all enclosed compensation scopes adopted the behavior.

At runtime the WFMS is analyzing if an atomic scope contains a compensation scope and if the compensation scope has been associated with a atomic scope behavior specification as described above. The WFMS is responsive to this specification in case the atomic scope has been aborted by applying the abort handling as defined in the atomic scope behavior specification.

1. If the compensation scope is entered, the compensation manager checks whether the "atomicScopeRollbackBehavior" attribute has been set to "noRollback" or "noActions". If not, standard processing continues. Otherwise the compensation manager checks whether a persistent lock indicating the value of the "atomicScopeRollbackbehavior" attribute has been acquired previously for the compensation scope. With the help of the persistent lock it can be determined whether the compensation scope has been executed already for that particular instance of the process model. If not, the compensation manager acquires a persistent lock that holds the value of the "atomicScopeRollbackBehavior" attribute. If the lock holds a value of "noActions" the compensation manager signals the navigator that the compensation scope should be skipped. The navigator is the WFMS component that performs navigation though the process graph based on the value of the process variables. The persistent lock is obviously acquired outside the current transaction; otherwise it would be reset as part of the transaction abort.
2. When the atomic scope completes, the compensation manager compensation scope completes, the navigator informs the compensation scope manager that the atomic scope has completed normally and that the persistent lock can be removed.
3. When the transaction associated with the atomic scope aborts, the transaction manager informs the compensation scope manager about this situation. The compensation manager checks whether the "atomicScopeRollbackBehavior" attribute has been set to "noRollback" or "noActions". If so, the compensation manager checks whether a persistent lock exists. If one exists, the compensation manager does not perform compensation.
4. When the intent is made to restart the compensation scope and the compensation manager determines that the persistent lock holds a value of "noAction" the compensation manager signals the navigator that the compensation scope should be skipped. Consequently the navigator will skip execution of the compensation scope.

If on the other hand the compensation manager determines that the persistent lock holds a value of "noRollback" re-execution of the compensation scope will be performed, but as a deviation of the standard processing the compensation scope's compensation activities are not executed.

Figure 10:
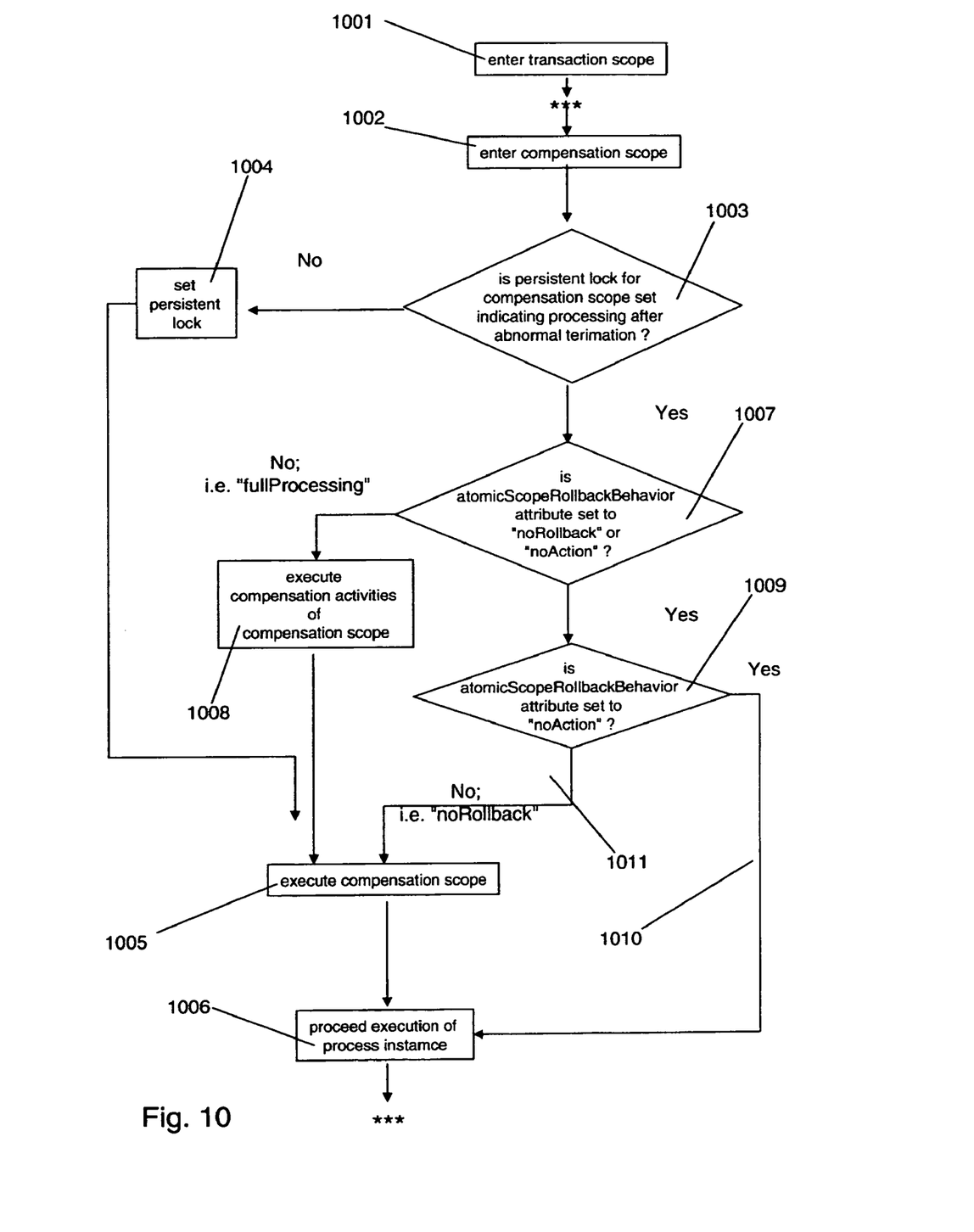
FIG. 10 depicts an overview of the method of how the WFMS is processing the new process model specification enhancement by performing a non standard processing of compensation scopes enclosed within atomic scopes.

Finally FIG. 10 depicts an overview of how the WFMS is analyzing the new process model specification enhancement and the WFMS's responsiveness by performing a non standard processing of compensation scopes enclosed within atomic scopes.

In steps 1001 and 1002 the WFMS is keeping control whether a compensation scope is comprised by an enclosing transaction scope.

The WFMS checks in step 1003 whether the atomic scope has been aborted abnormally. This check is based on analyzing whether a persistent lock for the compensation scope has been set; if a persistent lock has been detected, this indicates that the lock must have been set during a prior execution of the compensation scope which in turn indicates that the current re-execution of the compensation scope is due to an abort of the compensation scope.

Assuming that no persistent lock has been detected, the persistent lock will be set in step 1004 followed by the normal execution of the compensation scope in step 1005 and further followed by proceeding execution of the process instance in step 1006.

If a persistent lock was found in step 1003 the WFMS analyzes in step 1007 if the compensation scope has been associated with a specific atomic scope behavior specification according to the current invention. In particular this means investigating whether the "atomicScopeRollbackBehavior" attribute has been set to a value of "noRollback" or "noAction".

If no such association is comprised within the process model the WFMS performs the standard processing to compensate for the previous execution of the compensation scope by executing the compensation activities associated with the compensation scope in step 1008. Then, standard processing continues by executing the compensation scope again in step 1005 finally followed by proceeding execution of the process instance in step 1006.

If on the other hand a specific atomic scope behavior specification has been associated with the compensation scope, the compensation scope will be processed in step 1009 in accordance to the specific atomic scope behavior specification.

This means, if the "atomicScopeRollbackBehavior" attribute has been set to a value of "noAction" the WFMS completely skips re-execution of the compensation scope by moving control along the path 1010 and proceeding execution of the rest of the process instance in step 1006.

If on the other hand the "atomicScopeRollbackBehavior" attribute has been set to a value of "noRollback" the WFMS proceeds along path 1011 by suppressing execution of the compensation scope's compensation activities (1008); instead, the compensation scope is re-executed directly in step 1005 followed by proceeding execution of the rest of the process instance in step 1006.

The current invention is discussed in terms of a workflow management system executing the atomic scope and enclosing compensation scopes. Obviously the teaching is not limited to WFMS, the teaching can be applied to any system that is capable of handling compensation scopes within atomic scopes (or business transactions within atomic transactions); i.e. by systems with functionality comparable to WFMS.

The invention claimed is:

1. A method, implemented on a computer, for processing of a compensation scope of a process instance of a process model by a Workflow Management System (WFMS), said method comprising:
   determining, by a processor executing computer code, that said compensation scope is comprised within an atomic scope of said process model, and determining that the atomic scope has been aborted abnormally, wherein said determining that the atomic scope has been aborted abnormally comprises determining that a persistent lock associated with said compensation scope has been set, where said persistent lock has to be set before said atomic scope is aborted abnormally;

responsive to determining that the atomic scope has been aborted abnormally, restarting the atomic scope;

responsive to determining that the atomic scope has been aborted abnormally and restarted, determining that said compensation scope has been associated in said process model with a specific atomic scope behavior specification that defines a specific abort handling of said compensation scope in a particular case that said compensation scope is comprised within said atomic scope and said atomic scope has been aborted abnormally and restarted;

responsive to determining that said compensation scope has been associated in said process model with the specific atomic scope behavior specification, processing said compensation scope according to said specific atomic scope behavior specification; and wherein said processing said compensation scope according to said specific atomic scope behavior specification comprises identifying said specific atomic scope behavior specification as a first specification, and, in response to identifying said first specification, skipping re-execution of said compensation scope and proceeding execution of the rest of the atomic scope without executing a compensation activity associated with said compensation scope and wherein said processing said compensation scope according to said specific atomic scope behavior specification comprises identifying said specific atomic scope behavior specification as a second specification, and, in response to identifying said second specification, re-executing said compensation scope and proceeding execution of the rest of the atomic scope without executing the compensation activity associated with said compensation scope.

2. The method according to claim 1,
wherein said specific atomic scope behavior specification is particularly associated with said compensation scope and said method is responsive to said compensation scope only, or wherein said specific atomic scope behavior specification is particularly associated with said atomic scope and said method is responsive to said compensation scope and other compensation scopes comprised by said atomic scope, or wherein said specific atomic scope behavior specification is particularly associated with said process model and said method is responsive to said atomic scope and all other atomic scopes within said process model.

3. The method according to claim 1,
wherein said specific atomic scope behavior specification comprises at least one pair of a cause-behavior specification comprising:

a behavior part specification further comprising said first or said second specification; and a cause part specification specifying a cause for an abortion of said atomic scope; and wherein said determining that said compensation scope has been associated in said process model with a specific atomic scope behavior specification further comprises determining that said cause part specification matches an actual cause for an abortion of said atomic scope, said processing further comprises processing said compensation scope according to said behavior part specification.

4. A computer system comprising:
a bus;
a communications unit connected to the bus;
a storage device connected to the bus, wherein the storage device includes program code; and
a processor unit connected to the bus, wherein the processor unit runs the program code to:

determine that a compensation scope of a process instance is comprised within an atomic scope of a process model;

determine that the atomic scope has been aborted abnormally, wherein said determining that the atomic scope has been aborted abnormally comprises determining that a persistent lock associated with said compensation scope has been set, where said persistent lock has to be set before said atomic scope is aborted abnormally;

restart the atomic scope in response to determining that the atomic scope has been aborted abnormally;

in response to determining that the atomic scope has been aborted abnormally and restarted, determining that said compensation scope has been associated in said process model with a specific atomic scope behavior specification-that defines a specific abort handling of said compensation scope in a particular case that said compensation scope is comprised within said atomic scope and said atomic scope has been aborted abnormally and restarted;

in response to determining that said compensation scope has been associated in said process model with the specific atomic scope behavior specification, processing said compensation scope according to said specific atomic scope behavior specification; and wherein said processing said compensation scope according to said specific atomic scope behavior specification comprises identifying said specific atomic scope behavior specification as a first specification, and, in response to identifying said first specification, skipping re-execution of said compensation scope and proceeding execution of the rest of the atomic scope without executing a compensation activity associated with said compensation scope and wherein said processing said compensation scope according to said specific atomic scope behavior specification comprises identifying said specific atomic scope behavior specification as a second specification, and, in response to identifying said second specification, re-executing said compensation scope and proceeding execution of the rest of the atomic scope without executing the compensation activity associated with said compensation scope.

5. The computer system of claim 4,
wherein said specific atomic scope behavior specification is particularly associated with said compensation scope and said method is responsive to said compensation scope only, or wherein said specific atomic scope behavior specification is particularly associated with said atomic scope and said method is responsive to said compensation scope and other compensation scopes comprised by said atomic scope, or wherein said specific atomic scope behavior specification is particularly associated with said process model and said method is responsive to said atomic scope and all other atomic scopes within said process model.

6. The computer system of claim 4,
wherein said specific atomic scope behavior specification comprises at least one pair of a cause-behavior specification comprising:
a behavior part specification further comprising said first or said second specification; and
a cause part specification specifying a cause for an abortion of said atomic scope; and
wherein said determining that said compensation scope has been associated in said process model with a specific atomic scope behavior specification further comprises determining that said cause part specification matches an actual cause for an abortion of said atomic scope,
said processing further comprises processing said compensation scope according to said behavior part specification.

7. A computer program product stored on a computer usable storage medium, comprising computer readable program code, which when executed by a computer, cause said computer to perform a method comprising:
determining that a compensation scope of a process instance is comprised within an atomic scope of a process model;
determining that the atomic scope has been aborted abnormally, wherein said determining that the atomic scope has been aborted abnormally comprises determining that a persistent lock associated with said compensation scope has been set, where said persistent lock has to be set before said atomic scope is aborted abnormally;
responsive to determining that the atomic scope has been aborted abnormally, restarting the atomic scope;
responsive to determining that the atomic scope has been aborted abnormally and restarted, determining that said compensation scope has been associated in said process model with a specific atomic scope behavior specification-that defines a specific abort handling of said compensation scope in a particular case that said compensation scope is comprised within said atomic scope and said atomic scope has been aborted abnormally and restarted;
responsive to determining that said compensation scope has been associated in said process model with the specific atomic scope behavior specification, processing said compensation scope according to said specific atomic scope behavior specification; and
wherein said processing said compensation scope according to said specific atomic scope behavior specification comprises identifying said specific atomic scope behavior specification as a first specification, and, in response to identifying said first specification, skipping re-execution of said compensation scope and proceeding execution of the rest of the atomic scope without executing a compensation activity associated with said compensation scope and
wherein said processing said compensation scope according to said specific atomic scope behavior specification comprises identifying said specific atomic scope behavior specification as a second specification, and, in response to identifying said second specification, re-executing said compensation scope and proceeding execution of the rest of the atomic scope without executing the compensation activity associated with said compensation scope.

8. The computer program product of claim 7,
wherein said specific atomic scope behavior specification is particularly associated with said compensation scope and said method is responsive to said compensation scope only, or
wherein said specific atomic scope behavior specification is particularly associated with said atomic scope and said method is responsive to said compensation scope and other compensation scopes comprised by said atomic scope, or
wherein said specific atomic scope behavior specification is particularly associated with said process model and said method is responsive to said atomic scope and all other atomic scopes within said process model.

9. The computer program product of claim 7,
wherein said specific atomic scope behavior specification comprises at least one pair of a cause-behavior specification comprising:
a behavior part specification further comprising said first or said second specification; and
a cause part specification specifying a cause for an abortion of said atomic scope; and
wherein said determining that said compensation scope has been associated in said process model with a specific atomic scope behavior specification further comprises determining that said cause part specification matches an actual cause for an abortion of said atomic scope,
said processing further comprises processing said compensation scope according to said behavior part specification.

10. A method, implemented on a computer, for processing of a compensation scope of a process instance of a process model by a Workflow Management System (WFMS), the method comprising:
determining, by a processor executing computer code, that the compensation scope is embedded within an atomic scope of the process model;
determining that the atomic scope has been aborted abnormally, wherein the determining that the atomic scope has been aborted abnormally comprises determining that a persistent lock associated with the compensation scope has been set, where the persistent lock has to be set before the atomic scope is aborted abnormally;
responsive to determining that the atomic scope has been aborted abnormally, restarting the atomic scope;
responsive to entering the compensation scope, determining that the current execution of the compensation scope is due to a previous abort of the compensation scope;
responsive to determining that the atomic scope has been aborted abnormally and restarted, determining that the compensation scope is associated with a specific atomic scope behavior specification that defines handling of the compensation scope in a particular case that the compensation scope is embedded within the atomic scope and the current execution of the compensation scope is due to the previous abort of the compensation scope; and
responsive to determining that the compensation scope is associated with a specific atomic scope behavior specification, processing the compensation scope according to the specific atomic scope behavior specification, wherein the processing comprises:
responsive to determining that the specific atomic scope behavior specification is a first specification, skipping re-execution of the compensation scope and
responsive to determining that the specific atomic scope behavior specification is a second specification, re-executing the compensation scope; and suppressing execution of compensation activities associated with the compensation scope and executing a remainder of the atomic scope, wherein the suppressing execution of the compensation activities prevents undesired behavior of the compensation activities.

11. The method according to claim 10,
wherein the specific atomic scope behavior specification is particularly associated with the compensation scope and the method is responsive to the compensation scope only, or
wherein the specific atomic scope behavior specification is particularly associated with the atomic scope and the method is responsive to the compensation scope and other compensation scopes comprised by the atomic scope, or
wherein the specific atomic scope behavior specification is particularly associated with the process model and the method is responsive to the atomic scope and all other atomic scopes within the process model.

12. The method according to claim 10,
wherein the specific atomic scope behavior specification comprises at least one pair of a cause-behavior specification comprising:
a behavior part specification further comprising the first or the second specification; and
a cause part specification specifying a cause for an abortion of the atomic scope; and
wherein the determining that the compensation scope has been associated in the process model with a specific atomic scope behavior specification further comprises determining that the cause part specification matches an actual cause for an abortion of the atomic scope,
the processing further comprises processing the compensation scope according to the behavior part specification.

* * * * *